United States Patent [19]
Marklin et al.

[11] Patent Number: 5,850,777
[45] Date of Patent: Dec. 22, 1998

[54] FLOATING WRIST PIN COUPLING FOR A PISTON ASSEMBLY

[75] Inventors: Mark W. Marklin; Glen D. Prince, both of Mendon, Ill.

[73] Assignee: Coltec Industries Inc., Charlotte, N.C.

[21] Appl. No.: 890,144

[22] Filed: Jul. 9, 1997

[51] Int. Cl.⁶ ...................................................... F16J 1/14
[52] U.S. Cl. .............................. 92/187; 92/222; 74/579 E
[58] Field of Search .............................. 92/187, 216, 222, 92/238; 74/579 E

[56] References Cited

U.S. PATENT DOCUMENTS

| | | | |
|---|---|---|---|
| Re. 17,265 | 4/1929 | McKone | 92/187 X |
| 1,435,528 | 11/1922 | Keilholtz | 92/187 |
| 1,491,155 | 4/1924 | McKone | |
| 2,343,719 | 3/1944 | Ulrich | |
| 2,408,875 | 10/1946 | Parkins | 92/187 X |
| 2,850,340 | 9/1958 | Brill | |
| 3,161,185 | 12/1964 | Justinien et al. | |
| 3,943,908 | 3/1976 | Kubis et al. | |
| 4,050,360 | 9/1977 | Powers et al. | |
| 4,291,614 | 9/1981 | Mölle et al. | |
| 4,550,647 | 11/1985 | Coulin | |
| 4,574,591 | 3/1986 | Bertsch | |
| 4,696,224 | 9/1987 | Mishima | |
| 4,796,517 | 1/1989 | Akao et al. | |
| 5,367,945 | 11/1994 | Halka et al. | |
| 5,549,034 | 8/1996 | Loughlin | 92/187 |

*Primary Examiner*—Hoang Nguyen
*Attorney, Agent, or Firm*—Cummings & Lockwood

[57] ABSTRACT

The floating wrist pin coupling for a piston assembly will rotate within a bearing assembly for an oscillating connecting rod as a piston cycles through compression and suction strokes. As the wrist pin rotates through 360 degrees, the bearings within the bearing assembly are lubricated and subjected to a rotary rather than an oscillating motion as the connecting rod oscillates.

13 Claims, 3 Drawing Sheets

FIG_1

FLOATING WRIST PIN COUPLING FOR A PISTON ASSEMBLY

FIELD OF THE INVENTION

This invention relates to an improved coupling between both a wrist pin and a connecting rod and the piston pin and a piston in an oilless gaseous compressor or vacuum pump. More particularly, the improved coupling structure allows the wrist pin to freely rotate relative to both the connecting rod and the piston.

BACKGROUND OF THE INVENTION

It is known in the art relating to compressors and the like to connect a reciprocable piston with the small end of a connecting rod by a wrist pin or piston pin. In conventional non-lubricated reciprocating pumps, such as those in compressors or vacuum pumps, the piston pin is rigidly connected with the piston with the pin fixed inside of the piston bore through use of set screws located inside the piston or through an interference fit between the pin and piston bore. The pin would be either directly pressed inside of the piston bores or isolated from the piston bores by bushings installed in the piston bores. Conventionally, the connecting rod was free to rotate on the piston pin through use of a bearing assembly or a bushing positioned between the piston pin and the connecting rod. This bearing assembly in the connecting rod would be prelubricated with a lubricant, wherein the lubricant would be retained using seals positioned at each end of the bearing assembly. The problem encountered with this fixed pin arrangement is that in the bearing assembly, i.e. needle bearings, when the angle of oscillation between the connecting rod and the piston pin is less than 180 degrees, the life of any greased needle bearing subjected to the oscillating motion is greatly reduced as compared with rotary motion.

In reciprocating compressors and vacuum pumps, the angle of oscillation of the connecting rod is typically less than 40 degrees, and in an oilless compressor, the angle may be as low as 10 to 20 degrees. A reduction of life factor must be used to compensate for the oscillatory motion, because the life of the grease in the bearing assembly can be reduced by as much as four times when compared with the life of the grease in a bearing assembly experiencing rotary motion. Therefore, in a fixed pin design, relubrication of the wrist pin is required to extend the life of the wrist pins and bearings.

Accordingly, floating type wrist pins have been developed to overcome this deficiency in the breakdown of a lubricant in an oscillating bearing assembly. U.S. Pat. No. 4,291,614 issued to Mölle et al. discloses one such floating piston pin assembly which incorporates metallic bushes between the piston cross bore and piston pin, wherein the bushes are rotatable in the piston cross bore thus allowing the piston pin to be rotatable within the piston cross bore. However, Mölle et al. fails to disclose the use of a bearing assembly between the connecting rod and piston pin to allow free rotation between the connecting rod and the piston pin. Furthermore, since the bushes are free to rotate within the piston cross bore, the Mölle et al. piston assembly requires a special configuration to retain the bushes in place and prevent longitudinal outward movement of the bushes in the piston bore.

U.S. Pat. No. 5,367,945 issued to Halka et al. also discloses a floating piston pin assembly where the piston pin is of the floating type rotatable in the piston bore and the bushing of the connecting rod. The floating pin assembly of Halka et al., however, is directed toward use in a lubricated machine and would not be suitable for use in a non-lubricated reciprocating pump. For instance, Halka et al. utilizes an aluminum piston with the piston pin directly engaging the finished bore so that a lubricating medium must be utilized to prevent excessive heat transfer between the piston bore and piston pin.

Therefore, as can be seen from the foregoing, there is a need for a floating wrist pin coupling of a piston and a connecting rod which can be utilized in a non-lubricated reciprocating pump. Moreover, there is a need for a wrist pin which is freely rotatable relative to both a connecting rod and a piston which increases the grease life in a bearing assembly positioned between the wrist pin and the connecting rod to allow for a maintenance free design.

SUMMARY OF THE INVENTION

It is a primary object of the present invention to overcome the aforementioned shortcomings associated with the prior art.

Another object of the present invention is to provide a floating wrist pin coupling of a piston and a connecting rod for use in a non-lubricated reciprocating compressor or vacuum pump.

Yet another object of the present invention is to provide a floating wrist pin coupling of a piston and a connecting rod which is free to rotate relative to both the piston and the connecting rod.

Still another object of the present invention is to provide a floating wrist pin coupling of a piston and a connecting rod which reduces the wear on the coupling between the wrist pin and the connecting rod.

It is yet another object of the present invention is to provide in a reciprocating, non-lubricated machine a floating wrist pin coupling of a piston and a connecting rod which will extend the lubrication interval for the connecting rod bearings and extend the life of the bearings. The rotation of the wrist pin during reciprocation of the connecting rod operates the bearings in a manner similar to that of a rotating machine to even out bearing wear.

It is a further object of the present invention to provide a maintenance free design for a floating wrist pin coupling of a piston and a connecting rod.

Yet another object of the present invention is to provide a floating wrist pin coupling of a piston and a connecting rod which minimizes the heat transfer to the wrist pin from the piston, connecting rod and cylinder.

Still another object of the present invention is to provide a floating wrist pin coupling which may rotate 360° within the connecting rod.

These as well as additional objects and advantages of the present invention are achieved by providing a piston assembly having a floating wrist pin coupling of a piston and a connecting rod. The piston assembly includes a piston having two transverse bores extending laterally therethrough, wherein a connecting rod having a pin end is receivable in the piston with the pin end positioned between the two transverse bores in said piston. The pin end also includes a transverse opening which is positioned in axial alignment with the two transverse bores. The piston assembly further includes a cylindrical wrist pin with an axial bore mounted within the piston. Each end of the wrist pin is respectively positioned within one of the two transverse bores of the piston, where the wrist pin further extends through the transverse opening in the pin end of the connecting rod. The wrist pin is freely rotatable within both the transverse opening in the connecting rod and the two transverse bores in the piston. Cylindrical bushings are also secured within the transverse bores in the piston between the cylindrical wrist pin and the transverse bores so that the cylindrical wrist pin is freely rotatable within said cylindrical bushings. The piston assembly also includes a needle bearing mounted within the transverse opening in the connecting rod, wherein the needle bearing is positioned between the cylindrical wrist pin and the transverse opening so that the cylindrical wrist pin is freely rotatable within the needle bearing.

These as well as additional advantages of the present invention will become apparent from the following description of the invention with reference to several figures.

DETAILED DESCRIPTION OF THE INVENTION

Figure 1:
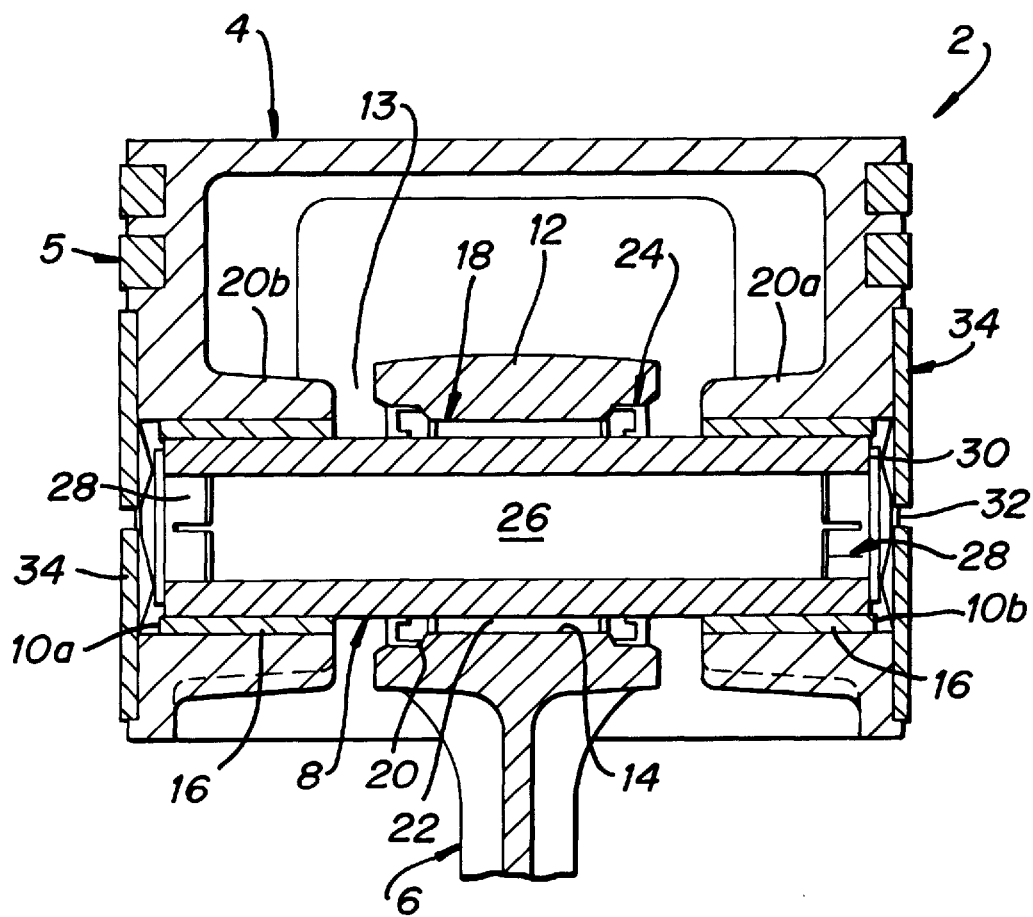
FIG. 1 is a cross-sectional view of the floating wrist pin coupling for a piston assembly in accordance with the preferred embodiment of the present invention.

Referring now to FIG. 1, a cross-sectional view of the piston assembly 2 is illustrated including a piston 4 with piston rings 5 and a connecting rod 6 attached together by a wrist pin or piston pin 8 of hardened steel. The piston 4 includes two transverse, aligned bores 10a and 10b extending laterally through wrist pin bosses 20a and 20b formed on the piston 4. The connecting rod 6 has a pin end 12 which fits in the lateral space 13 between the two bosses 20a and 20b. Wherein a transverse bore 14 is provided in the pin end 12 of connecting rod 6 so that the transverse bore 14 is in axial alignment with bores 10a and 10b when the connecting rod is attached to the piston 4. Transverse bores 10a, 10b and 14 are circular in shape and are kept in axial alignment by cylindrical wrist pin 8 which is positioned with one end in transverse bore 10a and the other end in transverse bore 10b while extending through transverse bore 14 in connecting rod 6.

Cylindrical bushings 16 are provided in the transverse bores 10a and 10b between the wrist pin 8 and piston 4. The bushings 16 are press-fit into the bores 10a and 10b so that they will not rotate with respect to the piston 4. However, wrist pin 8 has a slightly smaller diameter than that of bushings 16 allowing the wrist pin to freely rotate within the bushings while the bushings retain the wrist pin in axial alignment with bores 10a, 10b and 14. The bushings 16 are preferably made of a non-metallic material which is self-lubricating, such as an epoxy-backed polytetrafluoroethylene (PTFE) lined material. The thermal properties of the material used for the bushings 16 are such that the bushings minimize heat transfer from the piston 4 to the wrist pin 8. Thus the bushings 16 effectively isolate the wrist pin from the heat of compression generated inside the cylinder in which the piston 4 is reciprocating.

The connecting rod 6 also includes a bearing assembly 18, preferably a needle bearing assembly, positioned in the transverse bore 14 in pin end 12 of the connecting rod 6 between the wrist pin 8 and connecting rod. The needle bearing assembly 18 is press-fit in the transverse bore 14 and includes a plurality of needle bearings 22 positioned between the connecting rod and the wrist pin. A seal 24 is positioned at each end of the bearing assembly 18. The needle bearings 22 and the seals 24 are free to rotate in the connecting rod 6 while bearing assembly 18 is fixed to the bore 14 of the connecting rod. Furthermore, this arrangement allows wrist pin 8 to rotate relative to the transverse bore 14 as the needle bearings 22 rotate on the wrist pin. The bearing assembly 18 is packed with a lubricant, such as grease, that is capable of retaining its lubricating properties at temperatures up to 450° F. Since the seals 24 rotate relative to the wrist pin 8, the seals are also preferably made from a self-lubricating material, such as PTFE.

Figure 2:
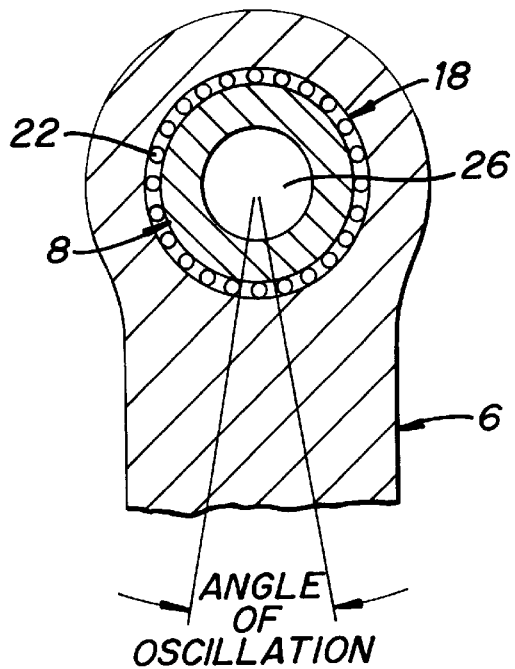
FIG. 2 is a cross-sectional side view of the attachment between the connecting rod and the wrist pin in accordance with the preferred embodiment of the present invention.
Figure 3:
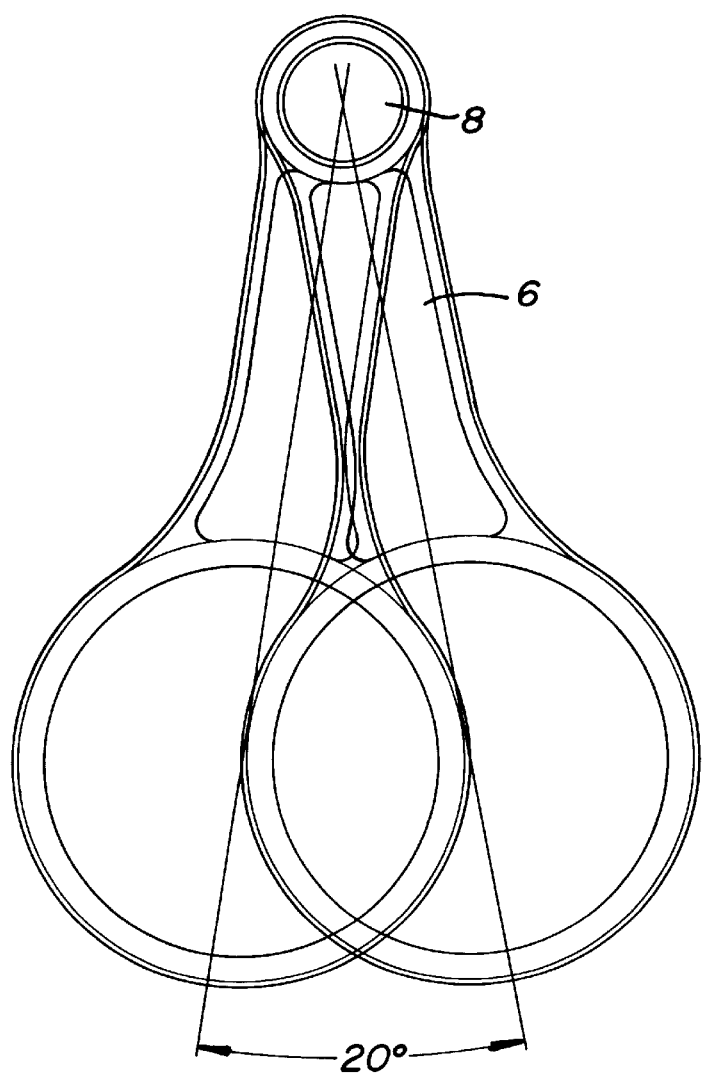
FIG. 3 is side view of the connecting rod of the present invention showing its angle of oscillation.

The connection between the wrist pin 8 and connecting rod 6 is further illustrated in FIG. 2. As can be seen from FIG. 2, the needle bearings 22 extend around the periphery of wrist pin 8 allowing the wrist pin to rotate within connecting rod 6 as the connecting rod oscillates back and forth through an angle of oscillation shown in FIG. 3.

The piston assembly 2 is assembled by inserting the wrist pin 8 through the bushings 16 attached to the piston 4 in bores 10a and 10b and through the needle bearing assembly 18 and seals 24 in the bore 14 of the connecting rod 6. The wrist pin 8 includes an axial bore 26 extending throughout its length and end caps 28 are positioned on each end of the wrist pin to close the bore. End caps 28 extend into axial bore 26 and include a brim portion 30 having a larger diameter than that of the axial bore so that the brim portion abuts the end of the wrist pin 8. The end caps 28 farther include a protrusion 32 which fits between a plurality of rider rings 34 wrapped around the skirt of the piston 4. Lateral movement of the wrist pin 8 is restricted by the end caps 28 engaging with rider rings 34. The end caps further serve to isolate the wrist pin 8 from external heat from the cylinder in which the piston assembly reciprocates, and the end caps are preferably made out of a material such as PTFE or the like.

Due to the above-described configuration, the wrist pin 8 is free to rotate relative to both the piston 4 and the connecting rod 6 within the bushings 16 and needle bearing assembly 18. This freely rotatable wrist pin greatly reduces the need to relubricate the needle bearing assembly 18 and, thus, increases the life of the wrist pin and needle bearings 22. Additionally, the rotation of the needle bearings 22 inside needle bearing assembly 18 facilitates the distribution of grease inside the needle bearing assembly which increases the life of the bearing assembly.

Figure 4C:
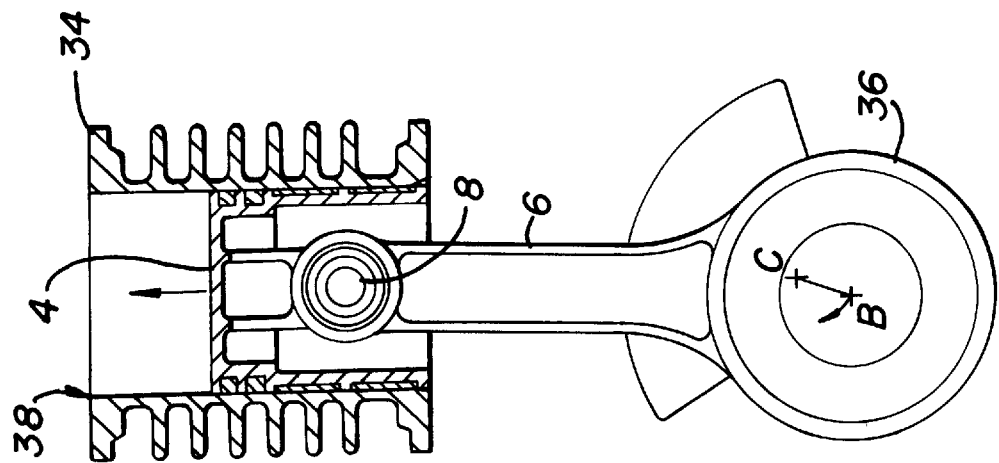
FIGS. 4(A)–(C) are cross-sectional side views of the piston assembly of the present invention showing the movement of piston in response to the oscillation of the connecting rod.
Figure 4B:
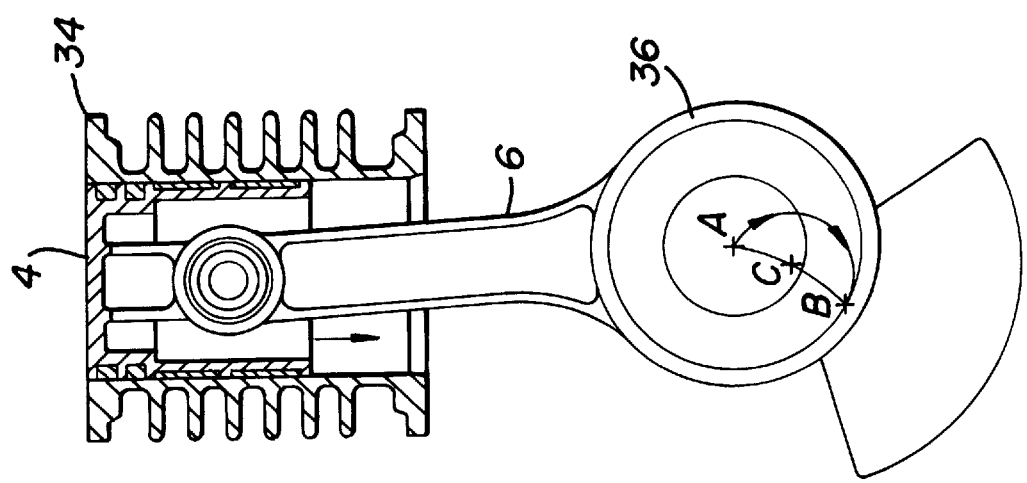
Figure 4A:
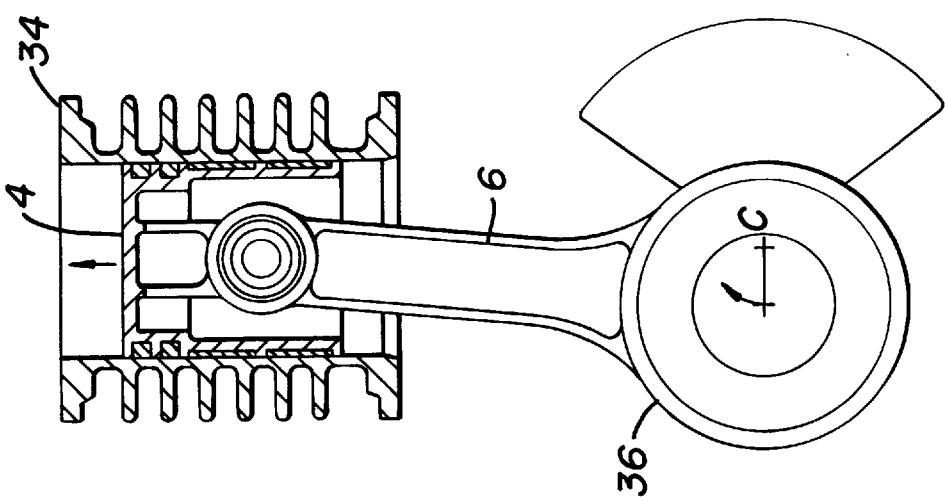

Referring now to FIGS. 4(A)–4(C), the operation of the piston assembly 2 is illustrated during its movement through the cylinder 35. As the piston 4 travels on its downward or suction stroke, shown in FIG. 4(B), the connecting rod 6 moves from position A to position B as the crank shaft end 36 of connecting rod 6 rotates about a central point C. When the piston 4 reaches the bottom dead center position of FIG. 4(C), the connecting rod 6 is in a vertical position in axial alignment with respect to the travel path in cylinder 35. The movement of the connecting rod 6 from position A to position 13 causes the wrist pin 8 to rotate in the same direction as connecting rod 6, wherein the needle bearings 22 in needle bearing assembly 18 rotate along with the wrist pin 8. As the piston 4 starts to travel on its upward stroke in Fig. 4(A), generally referred to as the compression stroke, the pressure within cylinder 35 increases as the piston travels toward the top end 38 of cylinder 35. The force from this increasing pressure is transmitted by the piston to the wrist pin 8 through the bushings 16. The friction from this force under load between the wrist pin 8 and the bushings 16 during the upward stroke is greater than the friction between the wrist pin and needle bearings 22. Therefore, there is no relative movement between the wrist pin and the piston 4 during the upward stroke, while there is relative movement between the wrist pin and connecting rod 6.

When the piston 4 reaches the top dead center position, the connecting rod 6 is again in a vertical position in axial alignment with the travel path in cylinder 35. The pressure inside the cylinder is relieved through a discharge valve (not shown) at or near the top dead center position and the piston again starts it downward stroke. When the piston starts its downward stroke, the 10 pressure inside the cylinder 35 is at or below atmospheric pressure, and the inertia force on the piston 4 changes at this instant. The frictional force between the bushings 16 and the wrist pin 8 is smaller on the downward. stroke, and the wrist pin is now free to rotate within both the bushings 16 and the needle bearings 22. Thus the wrist pin and the needle bearings rotate on the suction stroke and are locked in a stationary position by friction when the piston is on the upward compression stroke. During operation, the rotation of wrist pin 8 facilitates the distribution of grease inside the bearing assembly 18. The wrist pin 8 will rotate 360 degrees in a clockwise direction as the connecting rod oscillates in an arc during the movement of the piston 4.

While the preferred embodiments of the invention have been shown and described in detail, other modifications will readily be apparent to those skilled in the art. Thus, the preceding specification should be interpreted as exemplary rather than as limiting and the scope of the invention is limited only by the appended claims.

What is claimed is:

1. A piston assembly for a non-lubricated reciprocating machine comprising:

a piston having two opposed wrist pin receiving bosses, each of said bosses including a transverse bore extending laterally through said piston;

a connecting rod having a pin end receivable in said piston with said pin end positioned between said two wrist pin receiving bosses, said pin end including a transverse opening positioned in axial alignment with said transverse bores;

a cylindrical wrist pin mounted within said piston with a first end of said wrist pin positioned within one of said transverse bores and a second end of said wrist pin positioned within the other of said transverse bores; said wrist pin extending through said transverse opening in the pin end of said connecting rod and being mounted for rotation within said transverse opening in the pin end of said connecting rod and said transverse bores in the wrist pin receiving bosses;

a bearing assembly secured within said transverse opening in the pin end of said connecting rod, said bearing assembly being positioned between said cylindrical wrist pin and said connecting rod;

said bearing assembly including a plurality of rotatable needle bearings;

wherein said needle bearings are sealed in a lubricant to provide lubrication to the bearing assembly.

2. The piston assembly of claim 1, which includes a cylindrical bushing secured within each said transverse bore in said wrist pin receiving bosses, said cylindrical bushings each being positioned between said cylindrical wrist pin and a wrist pin receiving boss.

3. The piston assembly of claim 2, wherein said cylindrical bushings are formed of a self-lubricating material and are press fit within a transverse bore in a wrist pin receiving boss.

4. The piston assembly of claim 3, wherein said self-lubricating material is polytetrafluoroethylene.

5. The piston assembly of claim 3, wherein said cylindrical bushings insulate said wrist pin from heat generated by said piston.

6. The piston assembly of claim 1, wherein said cylindrical wrist pin will rotate within said bearing assembly as a result of an oscillating motion of said connecting rod.

7. The piston assembly of claim 1, wherein said bearing assembly includes lubricant seals mounted to enclose said needle bearings and to engage said wrist pin.

8. A piston assembly for a non-lubricated reciprocating machine comprising:

a piston having two opposed wrist pin receiving bosses, each of said bosses including a converse bore extending laterally through said piston;

a connecting rod having a pin end receivable in said piston with said pin end positioned between said two wrist pin receiving bosses, said pin end including a transverse opening positioned in axial alignment with said transverse bores;

a cylindrical wrist pin mounted within said piston with a first end of said wrist pin positioned within one of said transverse bores and a second end of said wrist pin positioned within the other of said transverse bores; said wrist pin extending through said transverse opening in the pin end of said connecting rod and being mounted for rotation within said transverse opening in the pin end of said connecting rod and said transverse bores in the wrist pin receiving bosses;

a bearing assembly secured within said transverse opening in the pin end of said connecting rod, said bearing assembly being positioned between said cylindrical wrist pin and said connecting rod; and rider rings wrapped around said piston for restricting the lateral movement of said wrist pin.

9. The piston assembly of claim 8, wherein said wrist pin has a transverse axial bore extending therethrough, said piston assembly further including end caps positioned on both ends of said cylindrical wrist pin and further extending into said axial bore; said end caps abutting said rider rings for restricting lateral movement of said wrist pin and being formed to isolate said wrist pin from external heat.

10. A piston assembly for a non-lubricated reciprocating machine comprising:

a piston cylinder;

a piston having two aligned, spaced, transverse bores extending laterally through said piston; said piston being mounted for reciprocal movement in said piston cylinder in a cycle including a suction stroke and a compression stroke;

a connecting rod having a pin end receivable in said piston between said two transverse bores in said piston; said pin end including a transverse opening posititioned in axial alignment with said two transverse bores;

a cylindrical wrist pin mounted within said piston having a first end positioned within one said two transverse bores and a second end positioned within the other of said two transverse bores;

said wrist pin being mounted for rotation within both said transverse opening in the pin end of said connecting rod and said two transverse bores in said piston and rotating when said piston is in the suction stroke but being locked against rotation by friction when said piston is in the compression stroke;

cylindrical bushings secured within said transverse bores in said piston, said cylindrical bushings being positioned between said cylindrical wrist pin and said piston so that said cylindrical wrist pin is rotable within said cylindrical bushings;

wherein said cylindrical bushings are formed from a self-lubricating material which insulates said wrist from heat; and a needle bearing assembly secured within said transverse opening in the pin end of said connecting rod, said needle bearing assembly being positioned between said cylindrical wrist pin and said connecting rod so that said cylindrical wrist pin is rotable within said needle bearing assembly;

a bearing assembly secured within said transverse opening in the pin end of said connecting rod, said bearing positioned between said cylindrical wrist pin and said connecting rod;

said bearing assembly includes a plurality of bearings sealed in a lubricant, the rotation of said wrist pin operating to distribute said lubricant within said bearing assembly.

11. The piston assembly of claim 10, wherein said self-lubricating material is polytetrafluoroethylene.

12. The piston assembly of claim 10, further including end caps positioned on both ends of said cylindrical wrist pin; said end caps being formed of material to isolate said wrist pin from external heat.

13. The piston assembly of claim 10 wherein said bearings engage said wrist pin, the rotation of said wrist pin operating to rotate said bearings, said wrist pin rotating through 360° as said piston reciprocates through a plurality of cycles.

* * * * *